United States Patent [19]

Kato

[11] Patent Number: 4,887,014
[45] Date of Patent: Dec. 12, 1989

[54] INDUSTRIAL ROBOT CONTROL DEVICE

[75] Inventor: Hisao Kato, Aichi, Japan

[73] Assignee: Mitsubishi Denki Kabushiki Kaisha, Tokyo, Japan

[21] Appl. No.: 156,137

[22] Filed: Feb. 16, 1988

[30] Foreign Application Priority Data

Feb. 16, 1987 [JP] Japan .................................. 62-32697
Feb. 16, 1987 [JP] Japan .................................. 62-32699

[51] Int. Cl.$^4$ ............................................. G05B 19/10
[52] U.S. Cl. ................................ 318/568.11; 318/49; 364/513; 361/91
[58] Field of Search ............... 318/568, 49, 59, 98, 318/103, 449–450, 453, 479, 568, 560-563, 565, 567, 569–570, 650; 364/513, 483, 138, 140–141; 361/88–91

[56] References Cited

U.S. PATENT DOCUMENTS

| 4,503,507 | 3/1985 | Takeda et al. | 318/568 G |
| 4,568,934 | 2/1986 | Allgood | 318/483 |
| 4,608,525 | 8/1986 | Mori et al. | 318/568 G |
| 4,698,766 | 10/1987 | Entwistle et al. | 364/513 |
| 4,730,258 | 3/1988 | Takeda et al. | 364/513 |

Primary Examiner—William M. Shoop, Jr.
Assistant Examiner—David Martin
Attorney, Agent, or Firm—Sughrue, Mion, Zinn, Macpeak, and Seas

[57] ABSTRACT

An industrial robot control device for use in an automobile manufacturing line for instance. The device is capable of preventing incorrect or improper operations of the machines due to a voltage drop in a power source, which occurs when a plurality of machines including the industrial robots are driven simultaneously.

9 Claims, 4 Drawing Sheets

“”

INDUSTRIAL ROBOT CONTROL DEVICE

BACKGROUND OF THE INVENTION

The present invention relates to an industrial robot control device for controlling a number of machines provided in a single production line. More particularly, the invention relates to an industrial robot control device for use in an automobile manufacturing line for instance, which is capable of preventing incorrect or improper operations of the machines due to a voltage drop in a power source, which occurs when a plurality of machines including the industrial robots are driven simultaneously.

Recently, there has been an increasing number of situations in which a large number of robots are installed in a single production line. In an automobile welding and assembling line, for example, there are provided a large number of industrial robots having spot welding guns and a large amount of electrical power is needed for such spot welding operations and robot drive control.

Therefore, when the various machines in the line are driven simultaneously, there may occur a risk of imperfect welding or incorrect robot operations due to a temporary drop in the power supply voltage.

This can be avoided by the provision of equipment which has a power supply capacity such that the supply voltage drop will not go below a predetermined value even if all the machines are actuated simultaneously. However, this approach to solving the problem is very costly.

As described above, the prior art device is disadvantageous due to imperfect welding or incorrect robot operations if all the machines in a line are actuated simultaneously since, from considerations of economy, it is generally necessary to employ power supply equipment having a capacity less than that required for sufficiently driving all the machines in the line sufficiently.

SUMMARY OF THE INVENTION

In view of the above, it is an object of the present invention to eliminate the drawbacks accompanying the prior art device as described above, and a further object of the present invention is to provide a control device capable of controlling a number of machines such as robots, welding machines and the like in a single production line so that undesired voltage drop in a power supply is eliminated to thereby allow the machines to perform their operations perfectly and effectively.

The above and other objects of the present invention are accomplished by the provision of a control device for controlling a plurality of machines including industrial robots provided in a single production line simultaneously, which comprises means for calculating a total amount of the voltage drop caused by actuation of said machines according to respective driving programs, at a predetermined monitoring interval; means for judging whether or not the total amount of the voltage drop is smaller than a predetermined level; means for selectively said machines so that a total amount of voltage drop caused by the selected machines is made smaller than the predetermined level when the total amount of voltage drop caused by all of said machines exceeds the predetermined level; and means for supplying drive instruction signals to said machines selected by said selecting means.

Another embodiment of the industrial robot control device of the invention comprises means for calculating a total amount of voltage drop caused by machines that are driven simultaneously according to drive programs for said machines at set period times, means for judging whether or not the total amount of voltage drop is within a predetermined value, means for selecting at least one of said machines to be driven simultaneously in accordance with priority ranking of said machines, and means for supplying drive instructions to said machines selected by said selecting means.

With the control device of the invention, there is no occurrence of voltage drop above a predetermined limit at which welding is imperfect or robots function incorrectly because the number of robots actuated simultaneously is restricted in the case where the voltage drop in a power source is above a predetermined value.

DETAILED DESCRIPTION OF THE PREFERRED EMBODIMENTS

Figure 1A:
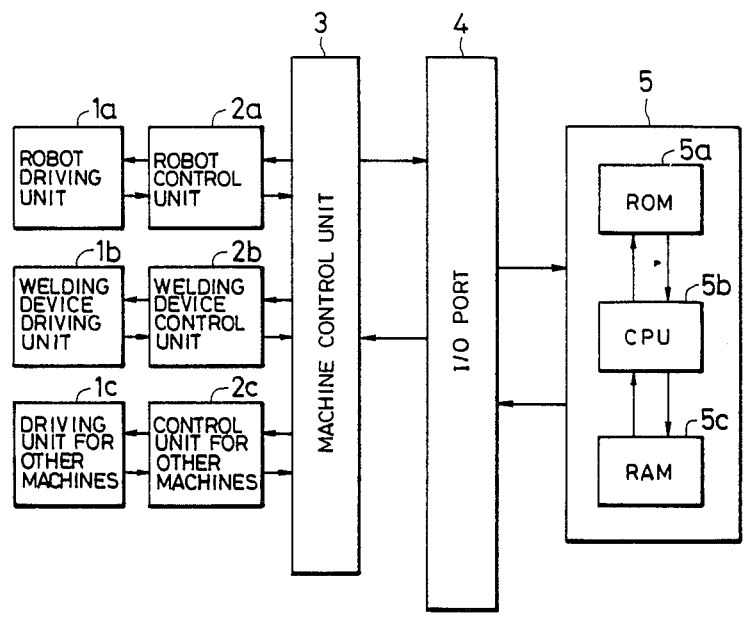
FIGS. 1(a) and 1(b) are block diagrams showing an embodiment of the present invention and a control unit in the embodiment in detail, respectively.

An embodiment of the invention will now be described with reference to FIGS. 1(a) and 1(b) which are a block diagram showing the embodiment and a partial detail block diagram of a control unit of the embodiment. In the figures, 1a, 1b and 1c denote drive units for driving industrial robots, welding devices and other machines provided in a single production line and 2a, 2b and 2c, control units for the robots, welding machines and the other machines, respectively. The arrangement is such that drive commands are supplied via a machine control unit 3 to those machines which are to be driven simultaneously.

4 denotes an I/O port and 5 denotes a microprocessor in which an amount of voltage drop in each of the machines, a permissible amount of voltage drop in a power source and a priority ranking of the machines, etc. are stored in memories ROM 5a and RAM 5c together with drive programs for the respective machines. Under the control of a CPU 5b, a total amount of voltage drop for the machines which are simultaneously driven at each set time according to the drive programs is obtained, and it is detected whether the total amount of voltage drop is smaller than a predetermined value. Further, if the total amount of voltage drop exceeds the predetermined value, ones of the machines which are to be driven simultaneously are selected from the machines, so that a total amount of voltage drops produced by activating the selected machines is made within the predetermined value. Instructions for designating the selected machines are supplied to the respective control units 2a to 2c.

Figure 1B:
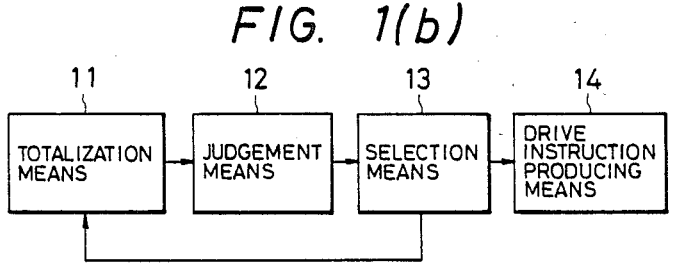

More specifically, as shown in FIG. 1(b), the machine control unit 3 includes a totalization unit 11 for totalizing the amounts of voltage drop in the machines that are to be driven simultaneously at set times according to the machine drive programs; a judgment unit 12 for judging whether or not the total amount of voltage drop is within a predetermined value; a selection unit 13 for selecting the machines to be driven simultaneously with reference to their priorities based on the result of judgment in the judgment unit 12; and a drive instruction producing unit 14 for applying drive instructions to the selected machines. When the total amount of the voltage drop exceeds the predetermined value, in the selection unit 13 machine(s) having lower priorities; which are low in an amount of work performed are excluded from the group of the simultaneously driven machines and the start of drive thereof is deferred.

Figure 2:
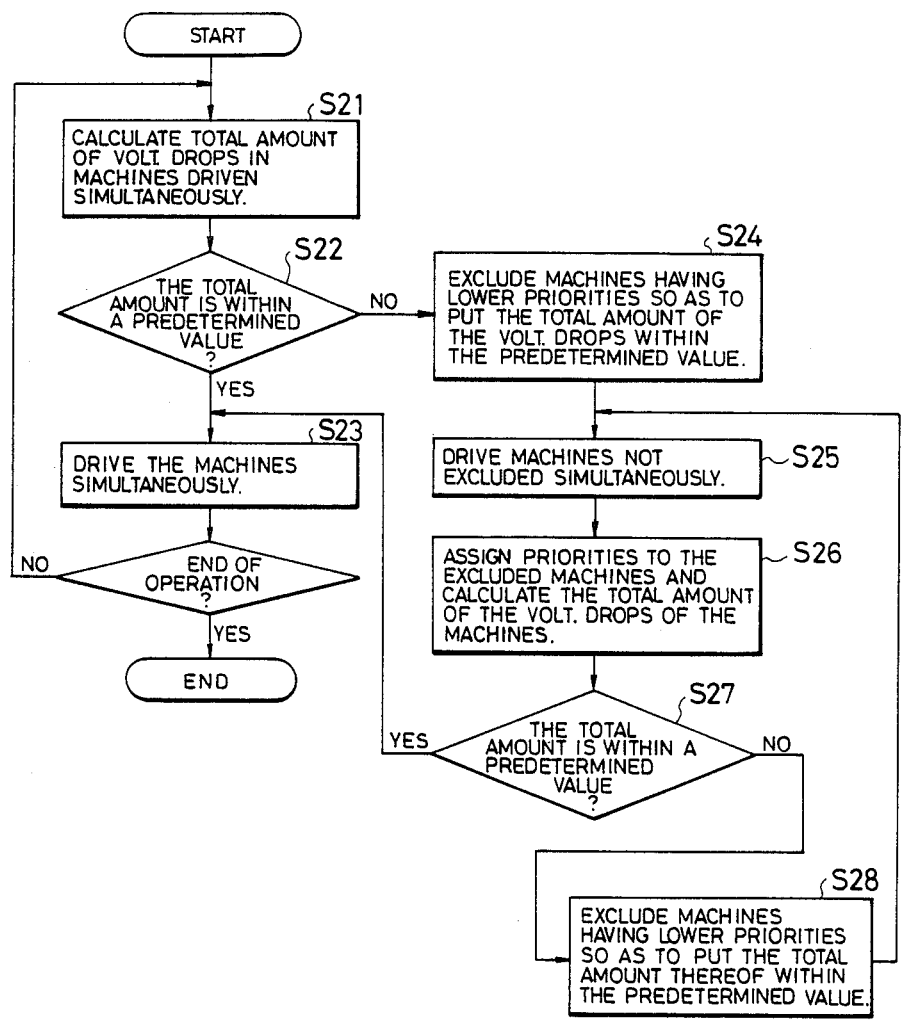
FIG. 2 is a flowchart of the embodiment of FIGS. 1(a) and 1(b)

Next, the operation will be described with reference to the flowchart of FIG. 2. First, the total amount of voltage drop in the machines that are to be driven simultaneously is calculated in the totalization unit 11 (step S21). The judgment unit 12 operates to judge whether or not the total amount of voltage drop is within the predetermined value (step S22). If it is within the predetermined value, the selection unit 13 and the drive instruction producing unit 14 operate to drive all of the machines which have been subjected to the totalization (step S23). On the other hand, if it exceeds the predetermined value, the machines having lower priorities, which are lower in the amount of work to be performed, are excluded by the selection unit 13 so as to bring the total amount of voltage drops to be within the predetermined value (step S24). Then, the machines that have not been excluded are simultaneously driven by the drive instruction producing unit 14 (step S25). Subsequently, the totalization unit 11 operates to assign higher priorities to the machines that have been excluded and a total amount of voltage drop in the machines that are to be driven simultaneously is again calculated by the totalization unit 11 (step S26). The judgment unit 12 then judges whether or not the total amount thereof is within the predetermined value (step S27). If it is, the operation advances to the step S23, while if it exceeds the predetermined value, those of the machines added on later which have lower priorities are excluded so as to bring the total amount of voltage drop to be within the predetermined value again (step S28) and the operation then advances to the above mentioned step S25.

Needless to say, although the above embodiment is an example relating to industrial robots and welding machines, the present invention is available in effecting overall control for machines including conveyors, etc.

Another embodiment of the present invention where a plurality of industrial robots are provided in a single production line will be described hereinafter.

Figure 3:
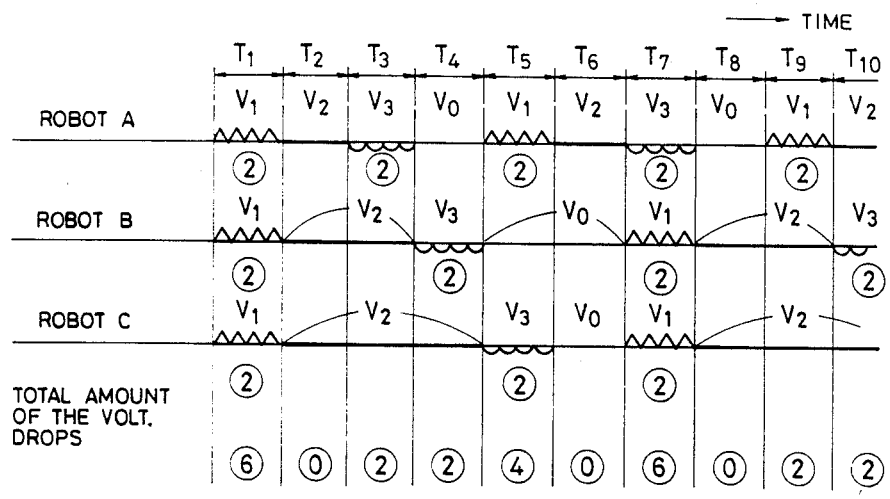
FIG. 3 is a diagram showing an operation pattern in the prior art device.

Provided that the predetermined value of the power supply voltage drop is 4, a problem may occur at an operation period of time $T_1$ or $T_7$ where the total amount of the voltage drop in robots A, B and C which are driven simultaneously as illustrated in the operation patterns shown in FIG. 3, exceeds the predetermined value of 4. In this case, the total amount of voltage drop in time period $T_1$ and $T_7$ is 6. In FIG. 3, $V_1$ indicates a time period when the robot moves in an accelerating mode and an amount of voltage drop is 2; $V_2$, a time period when the robot moves in a constant speed mode and the voltage drop amount is 0; $V_3$, a time period when the robot moves in a decelerating mode and the voltage drop amount is 2; and $V_o$, a time period when the robot is stopped and there is no voltage drop.

Figure 4:
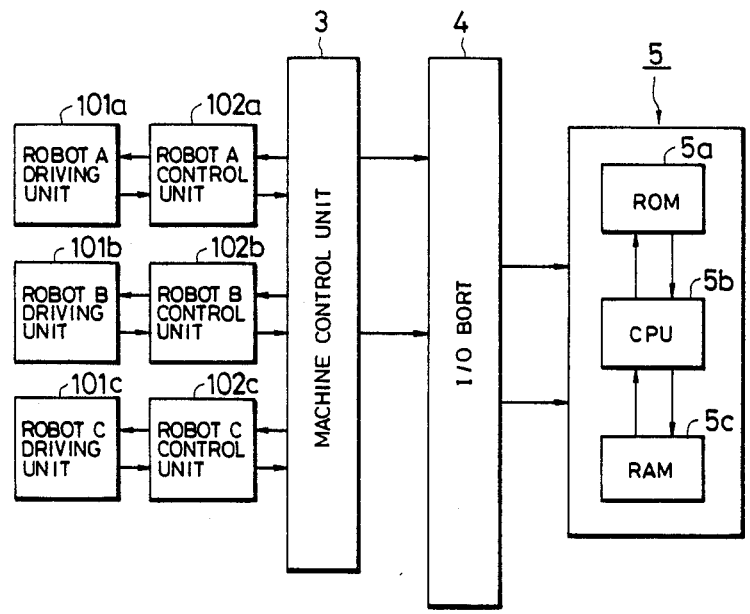
FIG. 4 is a block diagram showing another embodiment of the present invention.

In FIG. 1(b) and FIG. 4 which is a block diagram of another embodiment of the present invention, 101a, 101b and 101c are drive units for the robots A, B and C that are installed in a single production line, and 102a, 102b and 102c are control units for the robots A, B and C. The arrangement is such that drive instructions are supplied via the machines control unit 3 to those robots which it has been decided to drive simultaneously. In FIG. 4, elements that are same as those in FIG. 1(a) bear the same reference numerals and detailed description therefore is omitted intentionally.

Under the control of the CPU 5b, operation patterns in accordance with the drive programs of the various robots are divided with the set time periods, and the voltage drops of the robots that are simultaneously driven in each time period are totalized. Then, it is detected whether the total amount of voltage drop is within a predetermined value. As a result, if it exceeds the predetermined value, the robots that are to be simultaneously driven are selected so that the total voltage drop comes within the predetermined value and instructions are applied to the units 101a to 102c through the machine control unit 3.

More specifically, as mentioned above with reference to FIG. 1(b), the control unit 3 includes the totalization unit 11, the judgment unit 12, the selection unit 13 and drive instruction selection unit 14. In the totalization unit 11, an operation pattern of each robot is divided into plural parts with set time periods, the divided patterns are classified into four patterns in the accelerating mode, the decelerating mode, the constant speed operation mode and the stop mode, and a total amount of voltage drop in the robots driven simultaneously is calculated based on voltage drop values which are set with respect to the respective operation patterns described above in advance. The judgment unit 12 operates to judge whether or not the total amount of voltage drop thus obtained by the totalization unit 11 is within a predetermined value. When the total amount of voltage drop exceeds the predetermined value, the selection unit 13 operates to select robots that are to be driven simultaneously and defer the action of robots not selected to the next time period. The drive instruction producing means 14 then applies drive instructions to the selected robots that are to be driven simultaneously.

Figure 5:
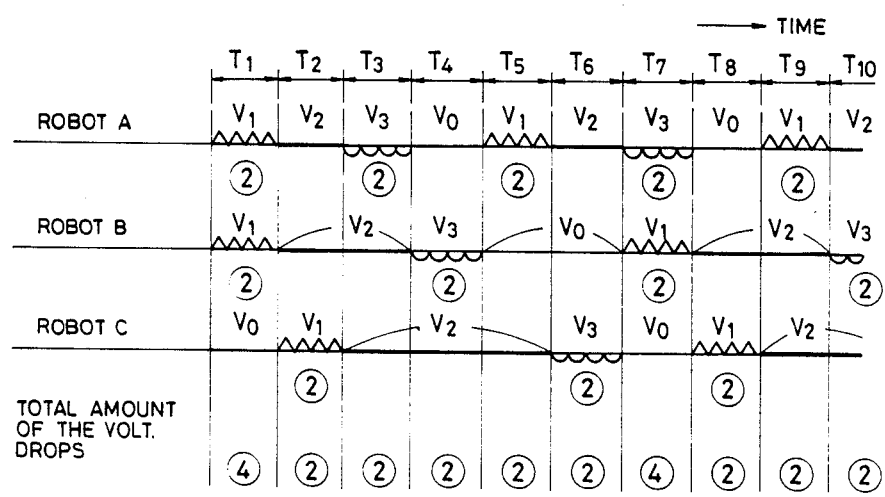
FIG. 5 is a diagram showing an operation pattern in the embodiment of the present invention shown in FIG. 4.

With this configuration, the operating pattern in the example of prior art shown in FIG. 3 is controlled in such a manner as shown in FIG. 5. In more detail, in the prior art example, the total amount of voltage drops in the time periods T1 and T7 is 6, which exceeds the permissible predetermined value of 4. But in this embodiment, the start of action of the robot C is delayed by one time period and deferred to the time period T2 thereby resulting in making the total amount of voltage drop equal to 4 or less in all the time periods. Consequently, there is no occurrence of a voltage drop exceeding the limit.

Needless to say, although the above embodiment was described with reference to three robots A, B and C, advantages can be made still greater by effecting control covering a larger number of robots, welding machines or other robots, etc.

As described above, the invention restricts the number of robots that are driven simultaneously if the total amount of voltage drop exceeds a prescribed value in a production line provided with a plurality of machines such as robots, welding machines and other machines. Therefore, there is no occurrence of a voltage drop beyond the maximum limit and no occurrence of imperfect welding or incorrect robot action.

What is claimed is:

1. A control device for controlling a plurality of machines including industrial robots provided in a single production line comprising:

means for calculating a total amount of voltage drop caused by actuations of said machines according to respective driving programs therefor at a predetermined monitoring interval;

means for judging whether or not the total amount of voltage drop is equal to or smaller than a predetermined level;

means for selecting at least one of said machines so that a total amount of voltage drop caused in said selected machines is made equal to or smaller than the predetermined level, when the total amount of voltage drop caused in all of said machines exceeds the predetermined level; and means for applying drive instruction signals to said machines selected by said selecting means.

2. The device as defined in claim 1 wherein said single production line is an automobile assembling line.

3. The device as defined in claim 2 wherein said industrial robots are provided to perform welding operation.

4. The device as defined in claim 1 wherein said machines comprise spot welding devices, robots for moving workpieces and a conveying means for conveying said workpieces.

5. The device as defined in claim 1 wherein said selecting means selects said machines according to priority ranking for said machines, lower priorities being assigned to said machines which are lower in an amount of working.

6. A control device for controlling a plurality of machines including industrial robots provided in a single production line, comprising:

means for calculating a total amount of voltage drop caused by machines that are driven simultaneously according to drive programs for said machines at set time periods;

means for judging whether or not the total amount of voltage drop is within a predetermined value;

means for selecting at least one of said machines to be driven simultaneously in accordance with priority ranking of said machines and so that a total amount of voltage drop caused in said selected machines is made equal to or smaller than the predetermined level; and means for applying drive instructions to said machines selected by said selecting means.

7. The device defined in claim 6 wherein, when the total amount of voltage drop exceeds the predetermined value, said selecting means selects at least one of said machines which has lower priority, the lower priority being assigned to said machine lower in an amount of working to be performed by said machine, and said selecting means differs the start of actuation of said robot selected to a following set time period.

8. The device as defined in claim 6 wherein said calculating means divides the operation pattern of said respective machines into plural parts with set time periods, the divided parts being classified into a predetermined number of patterns, and wherein a total amount of voltage drop in said machines driven simultaneously at each of the set time periods is calculated based on voltage drop values which are stored with respect to the respective four pattens in a memory means in advance.

9. The device as defined in claim 8 wherein the predetermined number of patterns are four patterns in an accelerating mode, a decelerating mode, a constant speed operation mode and a stop mode.

* * * * *